United States Patent
Guizilini et al.

(10) Patent No.: US 11,321,863 B2
(45) Date of Patent: May 3, 2022

(54) SYSTEMS AND METHODS FOR DEPTH ESTIMATION USING SEMANTIC FEATURES

(71) Applicant: Toyota Research Institute, Inc., Los Altos, CA (US)

(72) Inventors: Vitor Guizilini, Santa Clara, CA (US); Rares A. Ambrus, San Francisco, CA (US); Jie Li, Los Altos, CA (US); Adrien David Gaidon, Mountain View, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 133 days.

(21) Appl. No.: 16/804,457

(22) Filed: Feb. 28, 2020

(65) Prior Publication Data

US 2021/0090280 A1    Mar. 25, 2021

Related U.S. Application Data

(60) Provisional application No. 62/904,128, filed on Sep. 23, 2019.

(51) Int. Cl.
  *G06T 7/579* (2017.01)
  *H04N 13/271* (2018.01)
  *H04N 13/128* (2018.01)

(52) U.S. Cl.
  CPC ........... *G06T 7/579* (2017.01); *H04N 13/128* (2018.05); *H04N 13/271* (2018.05); *G06T 2207/20081* (2013.01)

(58) Field of Classification Search
  CPC . G06T 7/579; G06T 2207/20081; G06T 7/50; H04N 13/271; H04N 13/128
  (Continued)

(56) References Cited

U.S. PATENT DOCUMENTS 8,472,699 B2    6/2013   Ng et al.
10,088,814 B2   10/2018  Wenzel et al.
(Continued)

FOREIGN PATENT DOCUMENTS

CN    107993239 A   *  5/2018  ............ G06T 7/593
WO    2011017310 A1    2/2011

OTHER PUBLICATIONS

Bo Li, Chunhua Shen, Yuchao Dai, Anton van den Hengel, Mingyi He; De[th and surface normal estimation from monocular images using regression on dep features and hierarchical CRFs; 2015; IEEE pp. 5667-5671.*

(Continued)

*Primary Examiner* — Jerome Grant, II
(74) *Attorney, Agent, or Firm* — Christopher G. Darrow; Darrow Mustafa PC

(57) ABSTRACT

Systems, methods, and other embodiments described herein relate to generating depth estimates of an environment depicted in a monocular image. In one embodiment, a method includes identifying semantic features in the monocular image according to a semantic model. The method includes injecting the semantic features into a depth model using pixel-adaptive convolutions. The method includes generating a depth map from the monocular image using the depth model that is guided by the semantic features. The pixel-adaptive convolutions are integrated into a decoder of the depth model. The method includes providing the depth map as the depth estimates for the monocular image.

20 Claims, 8 Drawing Sheets

(58) Field of Classification Search
USPC .......................................................... 382/154
See application file for complete search history.

(56) References Cited

U.S. PATENT DOCUMENTS

| | | | |
|---|---|---|---|
| 10,353,271 | B2 | 7/2019 | Wang et al. |
| 2019/0043203 | A1* | 2/2019 | Fleishman ............... G06N 3/04 |
| 2019/0051056 | A1* | 2/2019 | Chiu ........................ G06T 7/136 |
| 2019/0139179 | A1 | 5/2019 | Wang et al. |
| 2019/0295282 | A1 | 9/2019 | Smolyanskiy et al. |
| 2020/0020157 | A1* | 1/2020 | Powers ................. G06T 19/003 |
| 2020/0032483 | A1* | 1/2020 | Ready-Campbell ........................ G05D 1/0274 |
| 2020/0090359 | A1* | 3/2020 | Pillai ..................... G06N 3/0454 |
| 2020/0241574 | A1* | 7/2020 | Lin .......................... G05D 1/12 |
| 2020/0265597 | A1* | 8/2020 | Ye ............................ G06T 7/50 |
| 2021/0086353 | A1* | 3/2021 | Shah ....................... G06T 7/593 |
| 2021/0158098 | A1* | 5/2021 | Shimizu ................... G06N 3/08 |
| 2021/0174524 | A1* | 6/2021 | Wang ........................ G06T 7/50 |

OTHER PUBLICATIONS

Reza Mahjourian, Martine Weicke, Anelia Angelova; Unsupervised Learning of Dept and Ego-Motion from Monocular Video Using 3D Geometric Constraints; 2018; IEEE; pp. 5667-5675.*
Godard, "Digging Into Self-Supervised Depth Estimation", found at: arXiv:1806.01260v4 [cs.CV] Aug. 17, 2019.
Lin et al., "Feature pyramid networks for object detection", found at: arXiv:1612.03144v2 [cs.CV] Apr. 19, 2017.
Godard et al., "Unsupervised monocular depth estimation with left-right consistency", found at: arXiv:1609.03677v3 [cs.CV] Apr. 12, 2017.
Guizilini et al., "Packnet-sfm: 3d packing for self-supervised monocular depth estimation", found at: arXiv:1905.02693v3 [cs.CV] Dec. 6, 2019.
Zhan et al., "Unsupervised learning of monocular depth estimation and visual odometry with deep feature reconstruction", In Proceedings of the IEEE Conference on Computer Vision and Pattern Recognition, pp. 340-349, 2018.
Yang et al., "Unsupervised learning of geometry with edge-aware depth-normal consistency" found at: arXiv:1711.03665v1 [cs.CV] Nov. 10, 2017.
Xiong et al., "Upsnet: A unified panoptic segmentation network", found at: arXiv:1901.03784v2 [cs.CV] Apr. 3, 2019.
Ummenhofer et al., "DeMoN: Depth and Motion Network for Learning Monocular Stereo", found at: arXiv:1612.02401v2 [cs.CV] Apr. 11, 2017.
Yang et al., "Every Pixel Counts: Unsupervised Geometry Learning with Holistic 3D Motion Understanding", found at: arXiv:1806.10556v2 [cs.CV] Aug. 15, 2018.
Bai et al., "Exploiting Semantic Information and Deep Matching for Optical Flow",found at: arXiv:1604.01827v2 [cs.CV] Aug. 23, 2016.
Cordts et al. "The cityscapes dataset for semantic urban scene understanding", In Proceedings of the IEEE conference on computer vision and pattern recognition, pp. 3213-3223, 2016.
Deng et al., "ImageNet: A Large-Scale Hierarchical Image Database",In Proceedings of the IEEE Conference on Computer Vision andPattern Recognition, 2009.
Eigen et al., "Depth map prediction from a single image using a multi-scale deep network", found at: arXiv:1406.2283v1 [cs.CV] Jun. 9, 2014.
Fischler et al., "Random sample consensus: A paradigm for model fitting with applications to image analysis and automated cartography", Commun. ACM, 24(6), 1981.
Fu et al., "Deep ordinal regression network for monocular depth estimation", In Proceedings of the IEEE Conference on Computer Vision and Pattern Recognition, pp. 2002-2011, 2018.

Garg et al., "Unsupervised cnn for single view depth estimation: Geometry to the rescue", found at: arXiv:1603.04992v2 [cs.CV] Jul. 29, 2016.
Geiger et al., "Vision meets robotics: The kitti dataset", The International Journal of Robotics Research, 32(11):1231-1237, 2013.
Jaderberg et al., "Spatial transformer networks, In Advances in neural information processing systems", pp. 2017-2025, 2015.
Pillai, et al., "Superdepth: Selfsupervised, super-resolved monocular depth estimation", Found at: arXiv:1810.01849, 2018.
Mahjourian et al., "Unsupervised learning of depth and ego-motion from monocular video using 3d geometric constraints", In Proceedings of the IEEE Conference on Computer Vision and Pattern Recognition, pp. 5667-5675, 2018.
Wu et al., "Group normalization", found at: arXiv:1803.08494v3 [cs.CV] Jun. 11, 2018.
Zhou et al., "Unsupervised learning of depth and ego-motion from video", In CVPR, vol. 2, p. 7, 2017.
Zou et al., "Df-net: Unsupervised joint learning of depth and flow using cross-task consistency", In European Conference on Computer Vision, 2018.
He et al., "Deep residual learning for image recognition", found at: arXiv:1512.03385v1 [cs.CV] Dec. 10, 2015.
Kendall, et al., "Multi-task learning using uncertainty to weigh losses for scene geometry and semantics", In Proceedings of the IEEE Conference on Computer Vision and Pattern Recognition, found at: arXiv:1705.07115v3 [cs.CV]Apr. 24, 2018.
Klodt et al., "Supervising the new with the old: Learning SFM from SFM", In European Conference on Computer Vision, pp. 713-728. Springer, 2018.
Lee et al., "Spigan: Privileged adversarial learning from simulation". In ICLR, 2019 (in 14 pages).
Manhardt et al., "Roi-10d: Monocular lifting of 2d detection to 6d pose and metric shape", found at: arXiv preprint arXiv:1812.02781, 2018.
Michels et al., "High speed obstacle avoidance using monocular vision and reinforcement learning", In Proceedings of the 22nd international conference on Machine learning, pp. 593-600. ACM, 2005.
Wang et al., "Learning depth from monocular videos using direct methods", In Proceedings of the IEEE Conference on Computer Vision and Pattern Recognition, pp. 2022-2030, 2018.
Wang et al., "Image quality assessment: from error visibility to structural similarity", IEEE transactions on image processing, 13(4):600-612, 2004.
Yang et al., "Deep virtual stereo odometry: Leveraging deep depth prediction for monocular direct sparse odometry", found at: arXiv:1807.02570v2 [cs.CV] Jul. 25, 2018.
Yin et al., "GeoNet: Unsupervised learning of dense depth, optical flow and camera pose", In Proceedings of the IEEE Conference on Computer Vision and Pattern Recognition (CVPR), vol. 2, 2018.
Guo et al., "Learning monocular depth by distilling cross-domain stereo networks", found at: arXiv:1808.06586v1 [cs.CV]Aug. 20, 2018.
Guney et al., "Displets: Resolving stereo ambiguities using object knowledge", In Conference on Computer Vision and Pattern Recognition (CVPR), 2015.
Kirillov et al., "Panoptic feature pyramid networks", found at: arXiv:1901.02446v2 [cs.CV] Apr. 10, 2019.
Lee at al., "Single-image depth estimation based on fourier domain analysis", In International Conference on Computer Vision and Pattern Recognition (CVPR), pp. 330-339, 2018.
Li et al., "Depth and surface normal estimation from monocular images using regression on deep features and hierarchical CRFs", In International Conference on Computer Vision and Pattern Recognition (CVPR), pp. 1119-1127, 2015.
Li et al., "Learning to fuse things and stuff", found at: arXiv:1812.01192v1 [cs.CV] Dec. 4, 2018.
Porzi et al., "Seamless scene segmentation", found at: arXiv:1905.01220v1 [cs.CV] May 3, 2019.
Qi et al., "Geometric neural network for joint depth and surface normal estimation", In International Conference on Computer Vision and Pattern Recognition (CVPR), pp. 283-291, 2018.

(56) References Cited

OTHER PUBLICATIONS

Wang et al., "Image quality assessment: from error visibility to structural similarity", IEEE transactions on image processing, 2004.
Chen et al., "Towards Scene Understanding: Unsupervised Monocular Depth Estimation With Semantic-aware Representation," found at: http://openaccess.thecvf.com/content_CVPR_2019/papers/Chen_Towards_Scene_Understanding_Unsupervised_Monocular_Depth_Estimation_With_Semantic-Aware_Representation_CVPR_2019_paper.pdf (2019).
Ochs et al., "SDNet: Semantically Guided Depth Estimation Network," found at: arXiv:1907.10659v1 [cs.CV] Jul. 24, 2019.
Schneider et al., "Semantically Guided Depth Upsampling," found at: arXiv:1608.00753v1 [cs.CV] Aug. 2, 2016.
Su et al., "Pixel-Adaptive Convolutional Neural Networks," found at: arXiv:1904.05373v1 [cs.CV] Apr. 10, 2019.
Casser et al. "Depth Prediction Without The Sensors: Leveraging Structure from Unsupervised Learning from Monocular Videos", found at: arXiv:1811.06152v1 [cs.CV] Nov. 15, 2018.
Brickwedde et al. "Mono-stixels: Monocular Depth Reconstruction of Dynamic Street Scenes", found at: arXiv:1908.02635v1 [cs.CV] Aug. 7, 2019.
Ramirez et al. "Geometry meets semantics for semi-supervised monocular depth estimation", found at: arXiv:1810.04093v2 [cs.CV] Oct. 26, 2018.
Oluwafemi et al. "Deep Classification Network For Monocular Depth Estimation", found at: arXiv:1910.10369v1 [cs.CV] Oct. 23, 2019.

\* cited by examiner

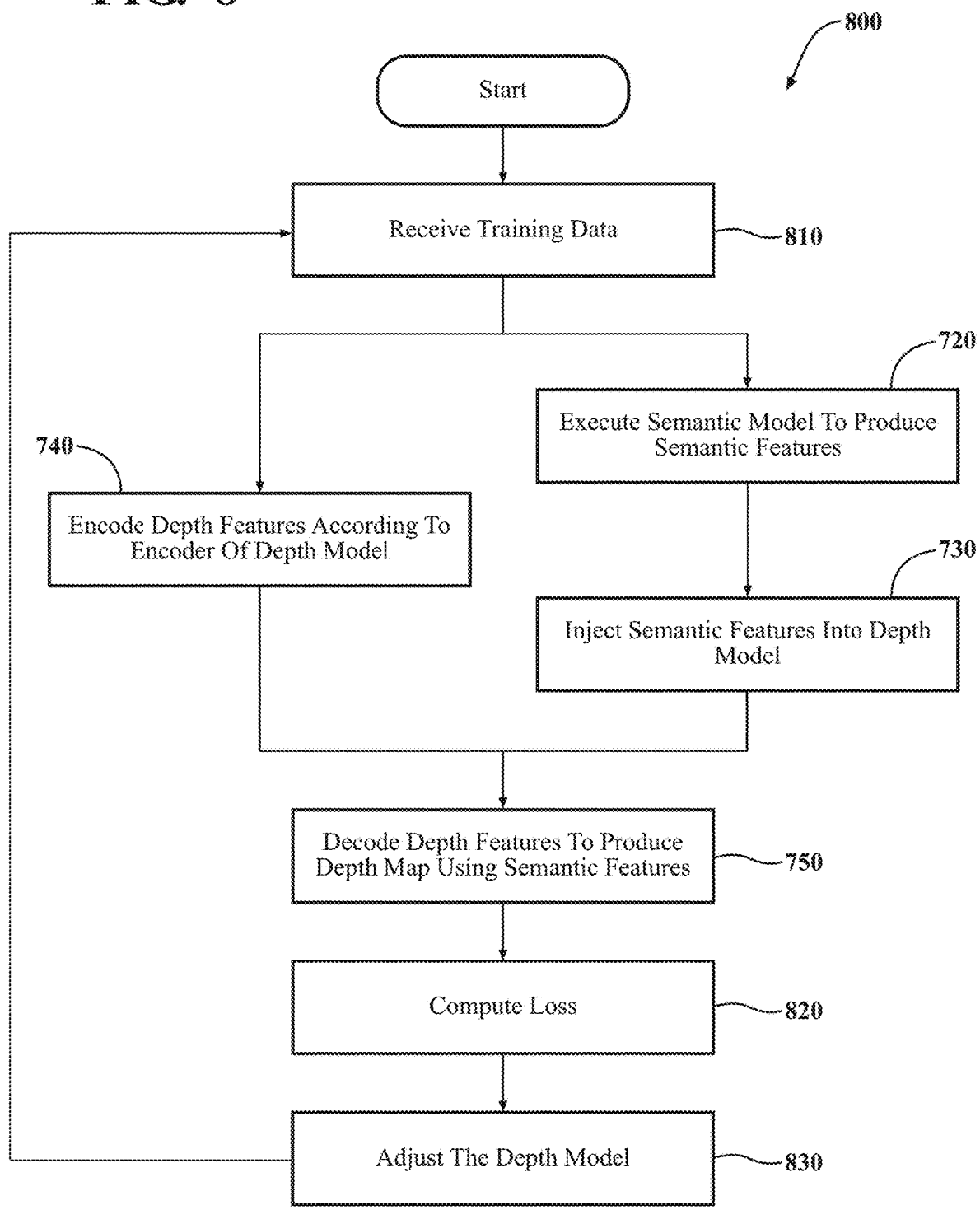

SYSTEMS AND METHODS FOR DEPTH ESTIMATION USING SEMANTIC FEATURES

CROSS-REFERENCE TO RELATED APPLICATIONS

This application claims benefit of U.S. Provisional Application No. 62/904,128, filed on, Sep. 23, 2019, which is herein incorporated by reference in its entirety.

TECHNICAL FIELD

The subject matter described herein relates, in general, to systems and methods for determining depths of a scene from a monocular image, and, more particularly, to injecting semantic information into a depth model to improve generation of depth estimates.

BACKGROUND

Various devices that operate autonomously or that provide information about a surrounding environment often use sensors that facilitate perceiving obstacles and additional aspects of the surrounding environment. For example, a robotic device uses information from the sensors to develop awareness of the surrounding environment in order to navigate through the environment and avoid hazards. In particular, the robotic device uses the perceived information to determine a 3-D structure of the environment to distinguish between navigable regions and potential hazards. The ability to perceive distances through estimation of depth using sensor data provides the robotic device with the ability to plan movements through the environment and generally improve situational awareness about the environment.

In one approach, the robotic device may employ monocular cameras to capture images of the surrounding environment; however, the captured images do not explicitly include depth information. Instead, the robotic device can implement processing routines that derive depth information from the monocular images. Leveraging monocular images to perceive depth can suffer from difficulties such as bleeding (i.e., smoothing between discontinuities) and failing to capture thin or small objects. In general, the noted difficulties may result from pixel-based metrics. As such, many difficulties associated with determining depth data persist that may result in reduced situational awareness for a device, and, thus, difficulties in navigating or performing other associated functions.

SUMMARY

In one embodiment, example systems, and methods relate to an improved approach to generating depth information from monocular images using semantic features. As previously noted, deriving depth data from monocular images may encounter various difficulties due to the pixel-based aspects of some approaches that can fail to capture geometric structure of different objects. That is, because of various intrinsic limitations in perceived data and/or the way in which the devices process the data, the devices may encounter circumstances in which a comprehensive determination of surrounding depths are not resolved, and may be realized as blended/bleeding regions that fail to fully capture discontinuities and/or fail to capture slim/small objects.

Therefore, in one embodiment, a depth system is disclosed that improves the processing of monocular images to resolve depth estimates by implementing a machine learning model that uses a novel architecture to inject semantic features into the model in order to guide generation of the depth estimates. In particular, the depth system implements a depth model that functions in cooperation with a semantic model. The semantic model and the depth model both process the monocular image. However, the semantic model performs semantic segmentation over the monocular image to distinguish between different objects represented in the image. Thus, the semantic model identifies semantic features in the image that generally define boundaries for the separate objects represented therein.

The depth model includes guiding connections with the semantic model that provide for injecting the semantic features into the depth model at various stages of a decoding process. Accordingly, the depth model uses the semantic features, in one approach, to guide determination of depth estimates using pixel-adaptive convolutions. The pixel-adaptive convolutions selectively weight different regions of the kernel to guide how the depth model generates the depth estimates by providing the depth model with knowledge about boundaries of the objects depicted in the image. In this way, the depth model leverages the additional information to improve depth estimates by avoiding difficulties with bleeding and failing to identify slim/small objects.

In one embodiment, a depth system for generating depth estimates of an environment depicted in a monocular image is disclosed. The depth system includes one or more processors and a memory communicably coupled to the one or more processors. The memory stores a depth module including instructions that when executed by the one or more processors cause the one or more processors to identify semantic features in the monocular image according to a semantic model. The depth module includes instructions to inject the semantic features into a depth model using pixel-adaptive convolutions. The depth module includes instructions to generate a depth map from the monocular image using the depth model that is guided by the semantic features. The pixel-adaptive convolutions are integrated into a decoder of the depth model to provide the semantic features to the depth model. The memory stores an image module including instructions that, when executed by the one or more processors, cause the one or more processors to provide the depth map as the depth estimates for the monocular image.

In one embodiment, a non-transitory computer-readable medium is disclosed for generating depth estimates of an environment depicted in a monocular image and including instructions that when executed by one or more processors cause the one or more processors to process perform various functions. The instructions include instructions to identify semantic features in the monocular image according to a semantic model. The instructions include instructions to inject the semantic features into a depth model using pixel-adaptive convolutions. The instructions include instructions to generate a depth map from the monocular image using the depth model that is guided by the semantic features. The pixel-adaptive convolutions are integrated into a decoder of the depth model to provide the semantic features to the depth model. The instructions include instructions to provide the depth map as the depth estimates for the monocular image.

In one embodiment, a method for generating depth estimates of an environment depicted in a monocular image is disclosed. The method includes identifying semantic features in the monocular image according to a semantic model. The method includes injecting the semantic features into a depth model using pixel-adaptive convolutions. The method includes generating a depth map from the monocular image using the depth model that is guided by the semantic features. The pixel-adaptive convolutions are integrated into a decoder of the depth model. The method includes providing the depth map as the depth estimates for the monocular image.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

FIG. 8 illustrates a flowchart of one embodiment of a method associated with training a depth model.

DETAILED DESCRIPTION

Figure 1:
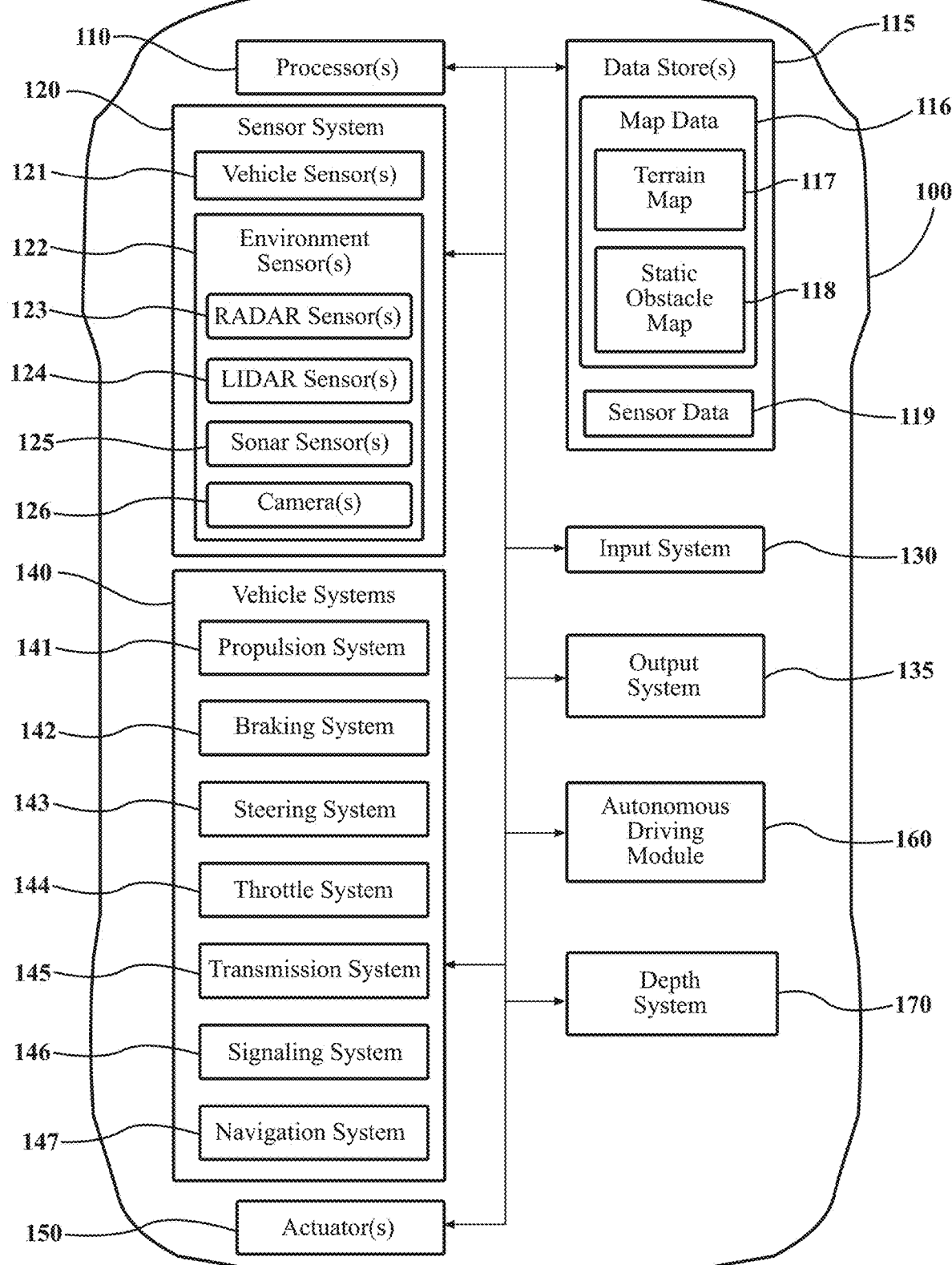
FIG. 1 illustrates one embodiment of a vehicle within which systems and methods disclosed herein may be implemented.

Systems, methods, and other embodiments associated with an improved approach to generating depth information from monocular images using semantic features are disclosed herein. As previously noted, perceiving aspects of the surrounding environment by inferring depths from monocular images can involve various difficulties such as erroneously defining depths at discontinuities, and so on. Therefore, in one embodiment, a depth system is disclosed that improves the processing of monocular images to resolve depth estimates by implementing a novel architecture for a machine learning model. In one approach, the novel architecture involves the use of semantic features to guide the generation of the depth estimates. That is, a depth model implements the novel architecture by functioning in cooperation with a semantic model that provides the semantic features.

Accordingly, the semantic model and the depth model both process the monocular image. However, the semantic model performs semantic segmentation over the monocular image to distinguish between different objects/components (e.g., surfaces) represented in the image. Generally, the process of performing semantic segmentation on an image functions to identify an association for each separate pixel in the image. That is, each separate pixel is associated with a corresponding object, component, surface or other aspect that the image represents. In this way, the semantic segmentation associates different portions of the image with the respective aspects to distinguish therebetween. Thus, the semantic model defines boundaries for the separate aspects represented therein.

To use the semantic features from the semantic model, in one embodiment, the depth model includes guiding connections. Other than conveying the semantic features from the semantic model to the depth model, the guiding connections, in at least one approach, include or at least provide the semantic features to guiding convolutions. The guiding convolutions function to transform the semantic features into a form that the depth model can process. Thus, the guiding connections generally function to prepare and inject the semantic features into the depth model at various stages of a decoding process. The decoding process within the depth model generally involves a series of pixel-adaptive convolutions.

The pixel-adaptive convolutions selectively weight different regions of the semantic features in comparison to depth features to guide how the depth model generates the depth estimates. As a broad explanation, the semantic features provide weights for the pixel-adaptive convolutions to inform the depth model about the boundaries of the components (e.g., objects) depicted in the image. Thus, as the depth model generates depth estimates from encoded depth features, the semantic features inform the depth model of discontinuities between separate components in the image. In this way, the depth model improves depth estimates by leveraging the additional information to gain further awareness about the spatial relationships of features in the image, thereby avoiding difficulties with bleeding between regions and failing to identify small objects.

Referring to FIG. 1, an example of a vehicle 100 is illustrated. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may be any robotic device or form of powered transport that, for example, proceeds through an environment according to assessed aspects of the environment, and thus benefits from the functionality discussed herein. In yet further embodiments, the vehicle 100 may be a statically mounted device, an embedded device, or another device that uses monocular images to derive depth information about a scene instead of being a motive device.

In any case, the vehicle 100 also includes various elements. It will be understood that, in various embodiments, it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are illustrated as being located within the vehicle 100, it will be understood that one or more of these elements can be located external to the vehicle 100. Further, the elements shown may be physically separated by large distances and provided as remote services (e.g., cloud-computing services, software-as-a-service (SaaS), etc.).

Some of the possible elements of the vehicle 100 are shown in FIG. 1 and will be described along with subsequent figures. However, a description of many of the elements in FIG. 1 will be provided after the discussion of FIGS. 2-8 for purposes of the brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In any case, the vehicle 100 includes a depth system 170 that functions to process monocular images and provide depth estimates for an environment (e.g., objects, surfaces, etc.) depicted therein. Moreover, while depicted as a stand-alone component, in one or more embodiments, the depth system 170 is integrated with the autonomous driving module 160, the camera 126, or another component of the vehicle 100. The noted functions and methods will become more apparent with a further discussion of the figures.

Figure 2:
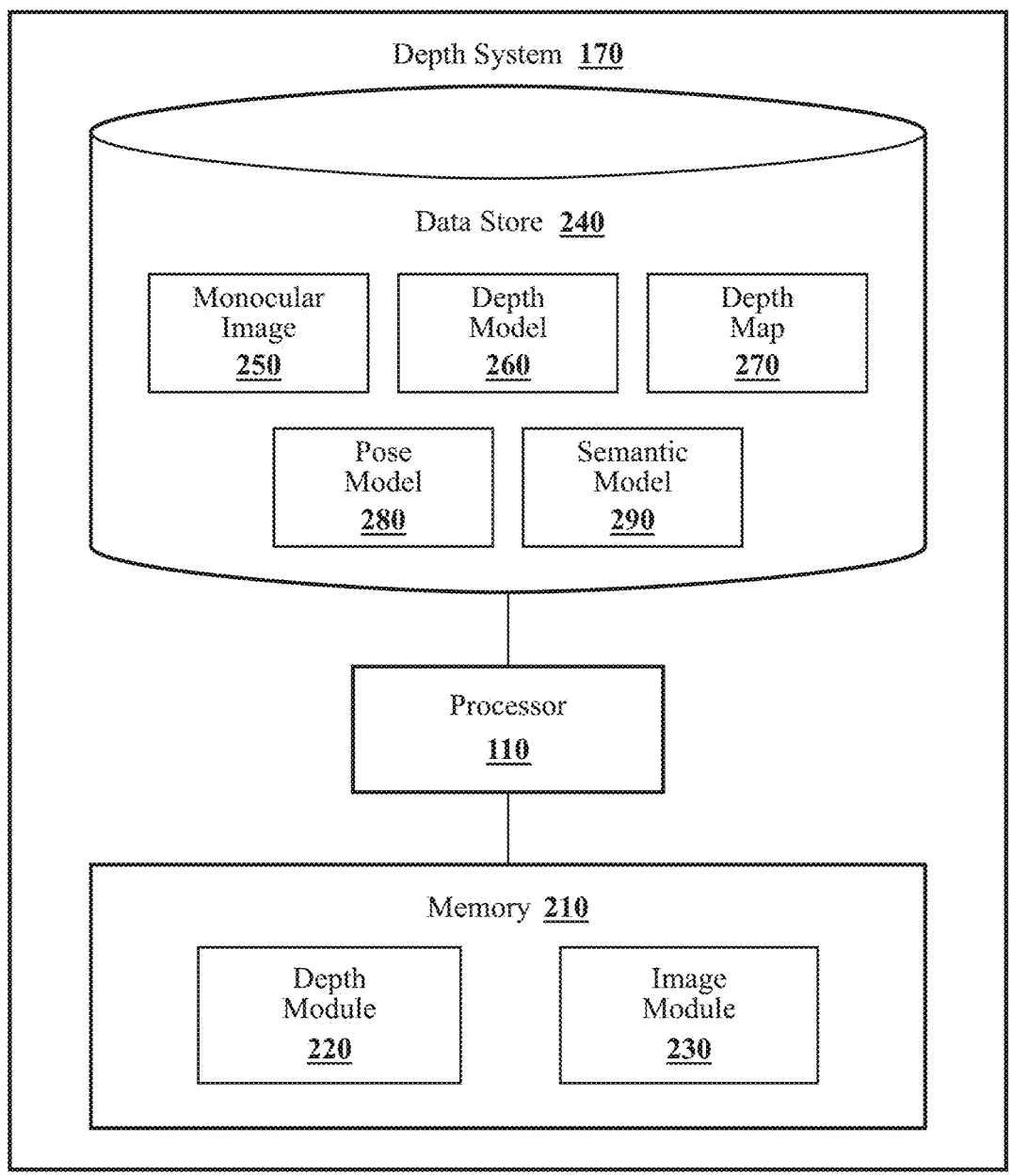
FIG. 2 illustrates one embodiment of a depth system that is associated with estimating depths in a surrounding environment using semantic features.

With reference to FIG. 2, one embodiment of the depth system 170 is further illustrated. The depth system 170 is shown as including a processor 110. Accordingly, the processor 110 may be a part of the depth system 170 or the depth system 170 may access the processor 110 through a data bus or another communication path. In one or more embodiments, the processor 110 is an application-specific integrated circuit (ASIC) that is configured to implement functions associated with a depth module 220 and an image module 230. In general, the processor 110 is an electronic processor such as a microprocessor that is capable of performing various functions as described herein. In one embodiment, the depth system 170 includes a memory 210 that stores the depth module 220 and the image module 230. The memory 210 is a random-access memory (RAM), read-only memory (ROM), a hard disk drive, a flash memory, or other suitable memory for storing the modules 220 and 230. The modules 220 and 230 are, for example, computer-readable instructions that, when executed by the processor 110, cause the processor 110 to perform the various functions disclosed herein.

Furthermore, in one embodiment, the depth system 170 includes a data store 240. The data store 240 is, in one embodiment, an electronic data structure stored in the memory 210 or another data store, and that is configured with routines that can be executed by the processor 110 for analyzing stored data, providing stored data, organizing stored data, and so on. Thus, in one embodiment, the data store 240 stores data used by the modules 220 and 230 in executing various functions. For example, as depicted in FIG. 2, the data store 240 includes monocular image(s) 250, a depth model 260, and a depth map(s) 270, a pose model 280, and a semantic model 290 along with, for example, other information that is used by the modules 220 and 230.

The monocular image 250 is, for example, an image from the camera 126 that encompasses a field-of-view about the vehicle 100 of at least a portion of the surrounding environment. That is, the image 250 is, in one approach, generally limited to a subregion of the surrounding environment. As such, the image 250 may be of a forward-facing (i.e., the direction of travel) 60, 90, 120-degree FOV, a rear/side facing FOV, or some other subregion as defined by the characteristics of the camera 126. In further aspects, the camera 126 is an array of two or more cameras that capture multiple images of the surrounding environment and stitch the images together to form a comprehensive 360-degree view of the surrounding environment.

In any case, the image 250 itself includes visual data of the FOV that is encoded according to an image standard (e.g., codec) associated with the camera 126. In general, characteristics of the camera 126 and the image standard define a format of the image 250. Thus, while the particular characteristics can vary according to different implementations, in general, the image 250 has a defined resolution (i.e., height and width in pixels) and format. Thus, for example, the monocular image 250 is generally an RGB visible light image. In further aspects, the image 250 can be an infrared image associated with a corresponding infrared camera, a black/white image, or another suitable format as may be desired. Whichever format that the depth system 170 implements, the image 250 is a monocular image in that there is no explicit additional modality indicating depth. In contrast to a stereo image that may integrate left and right images from separate cameras mounted side-by-side to encode a depth channel, the monocular image 250 does not include explicit depth information such as disparity maps derived from comparing the stereo images pixel-by-pixel.

Instead, the monocular image 250 implicitly provides depth information in the relationships of perspective and size of elements depicted in the image 250 from which the depth module 220 derives the depth map 270 by using at least the depth model 260 and the semantic model 290. Thus, with reference to FIG. 3, one embodiment of the depth model 260 is illustrated. In particular, the illustrated form of the model 260 identifies an exemplary flow of a processing channel formed by the model 260 for processing monocular images such as image 250. It should be appreciated that the depth model 260 is generally a machine learning algorithm/model that may be broadly characterized as a convolutional neural network (CNN) or as an encoder/decoder architecture including convolutional and deconvolutional components.

The monocular image 250 is provided as an input into the depth model 260. The depth model 260, in one embodiment, includes an encoder 300 that accepts the image 250 as an electronic input and processes the image 250 to extract depth features from the image 250. It should be appreciated that while the depth model 260 is discussed as a separate, distinct component, in one or more approaches, the depth model 260 is integrated with the depth module 220. Thus, the depth module 220 may implement various routines/functions of the model 260 while storing data values (e.g., weights) of the depth model 260 in the data store 240.

In any case, the depth features are, in general, aspects of the image that are indicative of spatial information that is intrinsically encoded therein. One example of an architecture for the encoding layers that form the encoder 300 may include a series of layers that function to fold (i.e., adapt dimensions of the feature map to retain the features) encoded features into separate channels, iteratively reducing spatial dimensions of the image 250 while packing additional channels with information about embedded states of the features. The addition of the extra channels avoids the lossy nature of the encoding process and facilitates the preservation of more information (e.g., feature details) about the original monocular image 250.

Accordingly, in at least one approach, the encoder 300 is comprised of multiple encoding layers formed from a combination of two-dimensional (2D) convolutional layers, packing blocks, and residual blocks. While the encoder 300 is presented as including the noted components, it should be appreciated that further embodiments may vary the particular form of the encoding layers (e.g., convolutional and pooling layers without packing layers), and thus the noted configuration is one example of how the depth system 170 may implement the depth model 260.

The separate encoding layers generate outputs in the form of encoded feature maps (also referred to herein as tensors), which the encoding layers provide to subsequent layers in the depth model 260, including specific layers of the decoder 310 via skip connections 320. Thus, the encoder 300 includes a variety of separate layers that operate on the monocular image 250, and subsequently on derived/intermediate feature maps that convert the visual information of the monocular image 250 into embedded state information in the form of encoded features of different channels. In any case, the output of the encoder 300 is, in one approach, a feature map having a particular dimension (e.g., 512×H/32× W/32) that is transformed in relation to the image 250 (e.g., 3×H×W).

The depth model 260 further includes the decoder 310. In one embodiment, the decoder 310 unfolds (i.e., adapt dimensions of the tensor to extract the features) the previously encoded spatial information in order to derive the depth map 270 (e.g., at separate resolutions as shown with corresponding labels for 320) according to learned correlations associated with the encoded features. That is, the decoding layers generally function to up-sample, through sub-pixel convolutions and other mechanisms, the previously encoded features into the depth map 270. In one embodiment, the decoding layers comprise unpacking blocks, two-dimensional convolutional layers, and inverse depth layers that function as output layers for different scales. While the decoder 310 is presented as including the noted components, it should be appreciated that further embodiments may vary the particular form of the decoding layers (e.g., deconvolutional layers without unpacking layers), and thus the noted configuration is one example of how the depth system 170 may implement the depth model 260.

As previously noted, the disclosed architecture of the encoder 300 may include packing blocks that fold encoded features into additional channels in order to preserve spatial information across the separate layers. In addition to folding the encoded features into the additional channels, the encoder 300 provides residual information directly to the decoder 310 via the skip connections 320. The skip connections 330 are, for example, connections between layers of the encoder 300 and the decoder 310 that convey higher-resolution encoded information between the encoder 300 and the decoder 310 thereby facilitating a flow of information (e.g., feature maps and gradients) to improve the depth map 270 (e.g., increase available detail).

As an additional brief explanation of the packing and unpacking blocks, in one approach, a packing block and an unpacking block include additional sub-layers or routines. For example, the packing block may include a Space-2-Depth layer, a first reshaping layer, a three-dimensional (3D) convolutional layer, a second reshaping layer, and a 2D convolutional layer. By contrast, the unpacking block includes, in one embodiment, a 2D convolutional layer, a first reshaping layer, a 3D convolutional layer, a second reshaping layer, and a Depth-2-Space layer. The packing block and the unpacking block are repeated throughout the encoder 300 and the decoder 310 according to various dimensions associated with a particular placement and integrating with the pixel-adaptive convolutions as described further subsequently.

In any case, the packing blocks, in one embodiment, function to fold spatial dimensions of intermediate convolutional feature maps into extra channels, thereby capturing sub-pixel information across the encoding layers to retain details of the monocular image 250. The packing blocks may replace, in one approach, striding and pooling layers by implementing the space-2-depth layer followed by the 3D convolutional layer. The space-2-depth layer itself, in one embodiment, functions to fold the additional channels into the intermediate feature map via sub-pixel convolutions. Thus, the space-2-depth layer, in combination with the 3D convolutional layer, function to aggregate packed feature maps and process spatial information folded into the extra channels. For example, the packing blocks achieve this by reshaping an input (e.g., an intermediate feature map from a prior layer) to produce a new channel that is subsequently concatenated back into an original channel after processing. The 2D convolutional layer then reduces the aggregated feature map to a desired number of output channels.

The unpacking blocks, in one embodiment, function to unfold convolutional feature channels from the encoding layers into spatial dimensions thereby leveraging sub-pixel convolutions of the depth-2-space layer for the preservation of details in the output depth map 270. The unpacking block leverages the depth-2-space layer as a replacement of, for example, convolutional feature up-sampling. The depth-2-space layer provides for a sub-pixel convolution operation that super-resolves output depth maps, and is combined with an additional 3D convolutional operation in the unpacking block to further aggregate information across the decoding layers. That is, the depth-2-space operation functions to unfold information from packed feature channels into spatial dimensions thereby providing a larger but shallower output that effectively super-resolves the depth estimates. The 2D convolution of the unpacking blocks functions to provide a requisite number of feature channels for the subsequent 3D convolutional layer. Arranging the 2D and 3D convolutions in this manner permits the 3D convolution to fully exploit packed spatial information by promoting feature aggregation across all three dimensions. The resulting feature maps may then be super-resolved to a target dimension/scale for output as the depth map 270.

Additionally, the depth model 260 further includes guiding connections 340. In one approach, the guiding connections 340 convey the semantic information from the semantic model 290 to the decoder 310. Further details of the semantic model 290 will be described subsequently, yet it should be appreciated that the semantic model 290 provides the semantic features from intervening connections between layers of the model 290 in order to convey the semantic features at different levels of detail that generally correspond with points at which the connections 340 inject the semantic features.

As illustrated, the depth model 260 includes four separate guiding connections 340. Thus, the guiding connections 340 inject the semantic features into the decoder 310 at separate successive layers providing separate refinements in the detail of features into the decoder 310. The semantic features associated with the separate guiding connections 340 correspond with a form of the particular decoding layer to which the features are being injected. That is, the dimensions representing the semantic features correspond with the particular decoding layer and the guiding connections 340 may provide the semantic features from the semantic model 290 via guiding convolutions that adapt the semantic features for the dimensions.

In one embodiment, the guiding convolutions for each separate guiding connection 340 include a sequence of two convolutional layers with a first layer having a kernel size of three and output channels equal to two times the input channels, and the second layer having a kernel size of one and output channels equal to depth input channels of pixel-adaptive convolutions for the corresponding decoding layer. The separate guiding convolutional layers are, in one embodiment, followed by group normalization with G=16 and ELU non-linearities. These guiding convolutions provide for formatting the semantic features for input into, in one embodiment, the pixel-adaptive convolutions. The pixel-adaptive convolutions use the semantic features to guide generation of the depth map 270 by, for example, delineating depth discontinuities in the monocular image 250 according to the semantic features.

Figure 4:
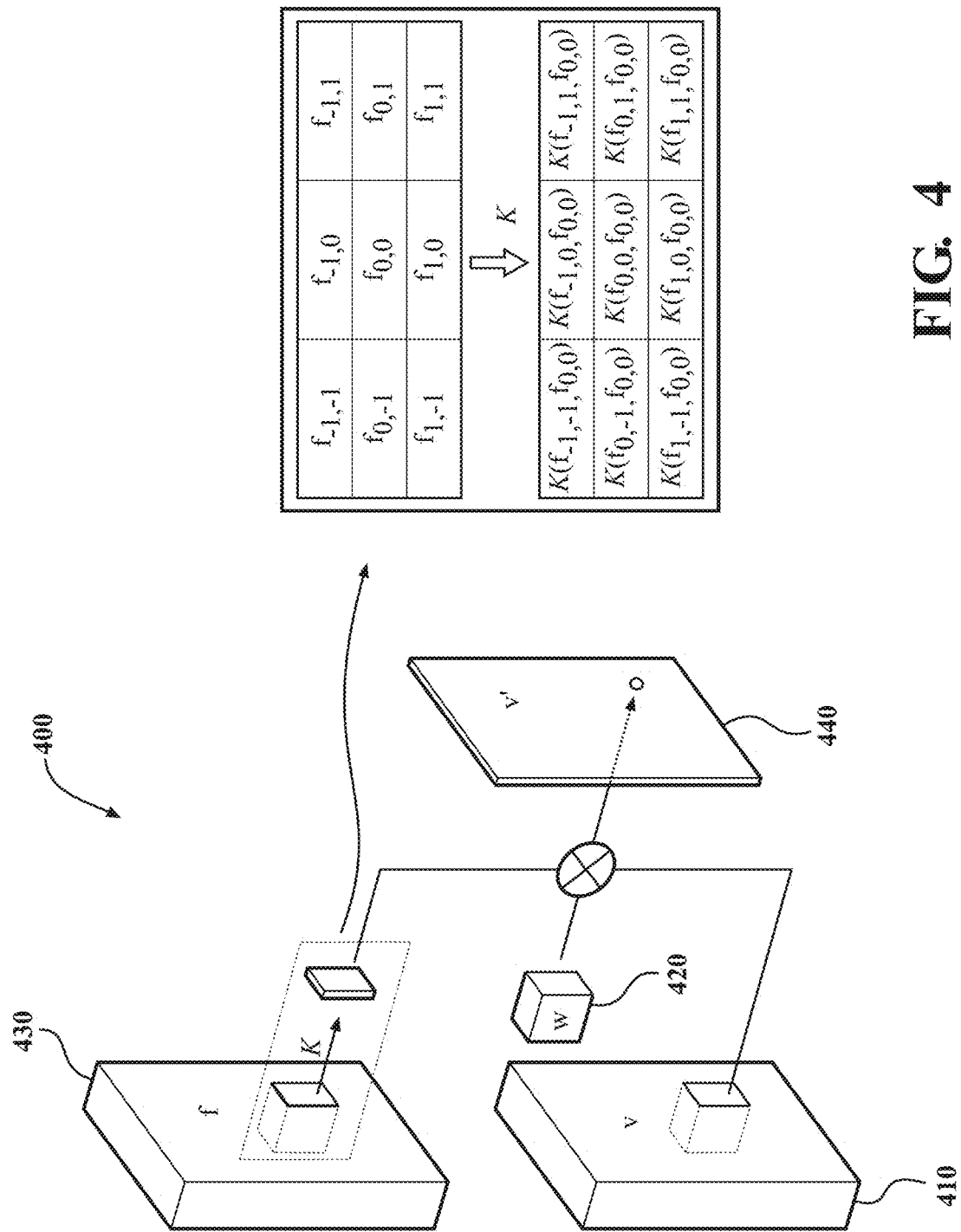
FIG. 4 illustrates a diagram of one embodiment of a pixel-adaptive convolutional layers.

With reference to FIG. 4, one example of a pixel-adaptive convolution 400 is illustrated. In general, the pixel-adaptive convolutions can, for example, substitute for other convolutions and function by multiplying filter weights with a spatially varying kernel that depends on learnable local pixel features, such as semantic features. As shown in FIG. 4, depth features 410 (v) are inputs that the pixel-adaptive convolutional layers convolve with weights (W) 420 with the guidance of semantic features 430 (f). As shown in the tables, the pixel-adaptive convolutional layer 400 provides the resulting output depth features 440 (v') according to the weights 420 and the semantic features 430. Equation (1) further details the noted operation.

$$v'=\Sigma_{j\in\Omega(i)}K(f_i,f_j)W[p_i-p_j]v_j+b \quad (1)$$

In equation (1), f∈$R^D$ are features from the semantic model 290 that guide the pixel-adaptive convolutions from the depth model 260. p=(x, y)$^T$ are pixel coordinates with [$p_i-p_j$] denoting 2D spatial offsets between pixels. $W_{k\times k}$ are convolutional weights with kernel size k, $\Omega_{ij}$ defines a k×k convolutional window around j, $v_j$ is the input signal to be convolved, and f ε $R^1$ is a bias term. K is the kernel used to calculate the correlation between guiding features, which may be the standard Gaussian kernel or another suitable distribution.

$$K(f_i,f_j)=\exp(-\tfrac{1}{2}(f_i-f_j)^T\Sigma_{ij}^{-1}(f_i-f_j)) \quad (2)$$

In equation (2), $\Sigma_{ij}$ is the covariance matrix between features $f_i$ and $f_j$, chose to be a diagonal matrix $\sigma^2$, $I_{D\times D}$, with σ as an extra learnable parameter for each convolutional filter. The kernel evaluations can be considered a secondary set of weights applied to the existing convolutional weights, changing the extent to which the existing weights influence the depth features depending on the guidance of the semantic features. Accordingly, the pixel-adaptive convolutional layers inject the semantic features into the determinations of the depth features to guide generation of the depth features using the semantic features. Thus, because the semantic features correspond to the objects, surfaces, and other components and define the boundaries of the components in the monocular image, the decoder 310 can better evaluate the discontinuities through the use of the semantic features via the pixel-adaptive convolutions.

Figure 5:
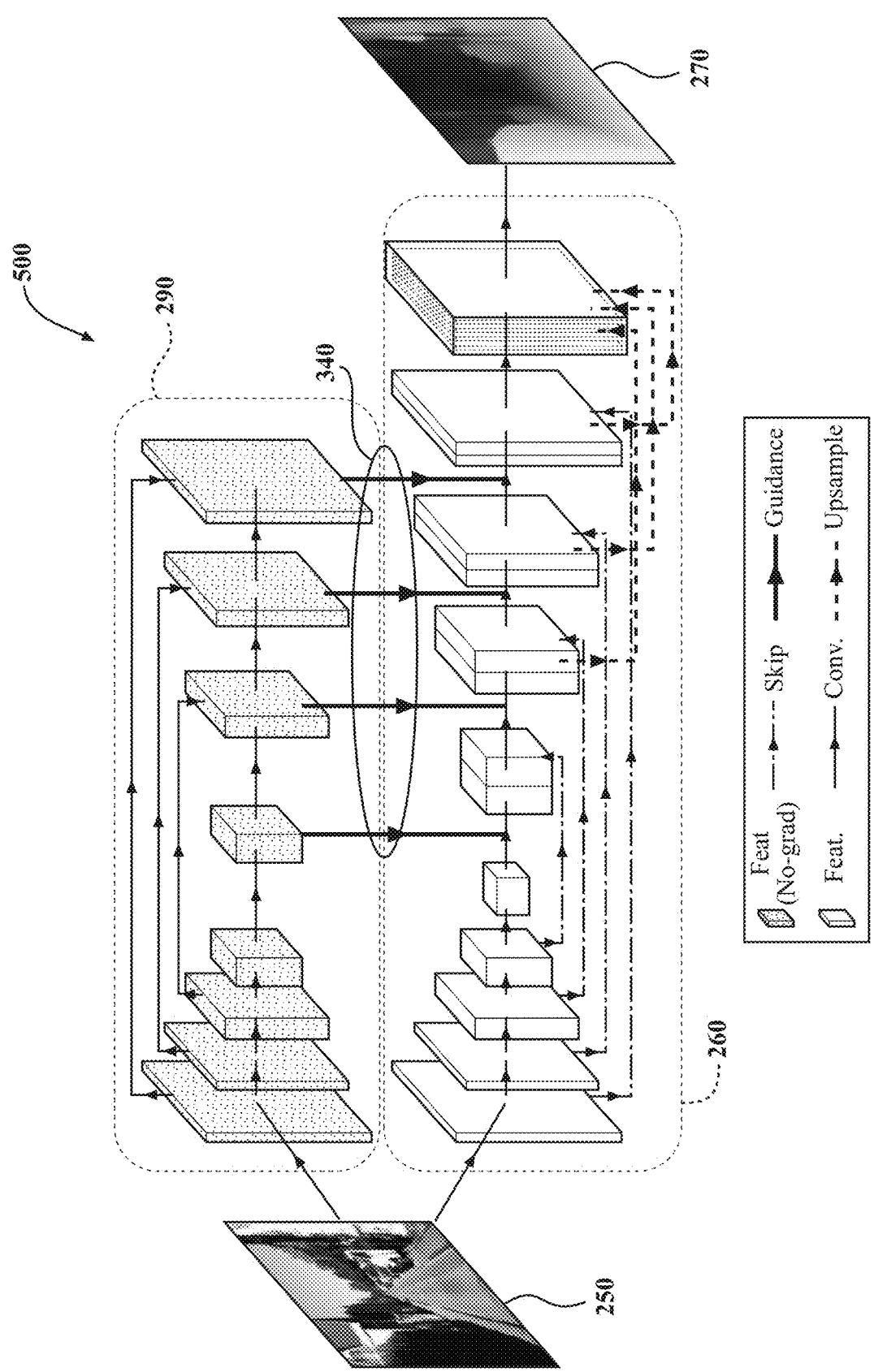
FIG. 5 illustrates a diagram of one embodiment of a semantic model in combination with a depth model.
Figure 6:
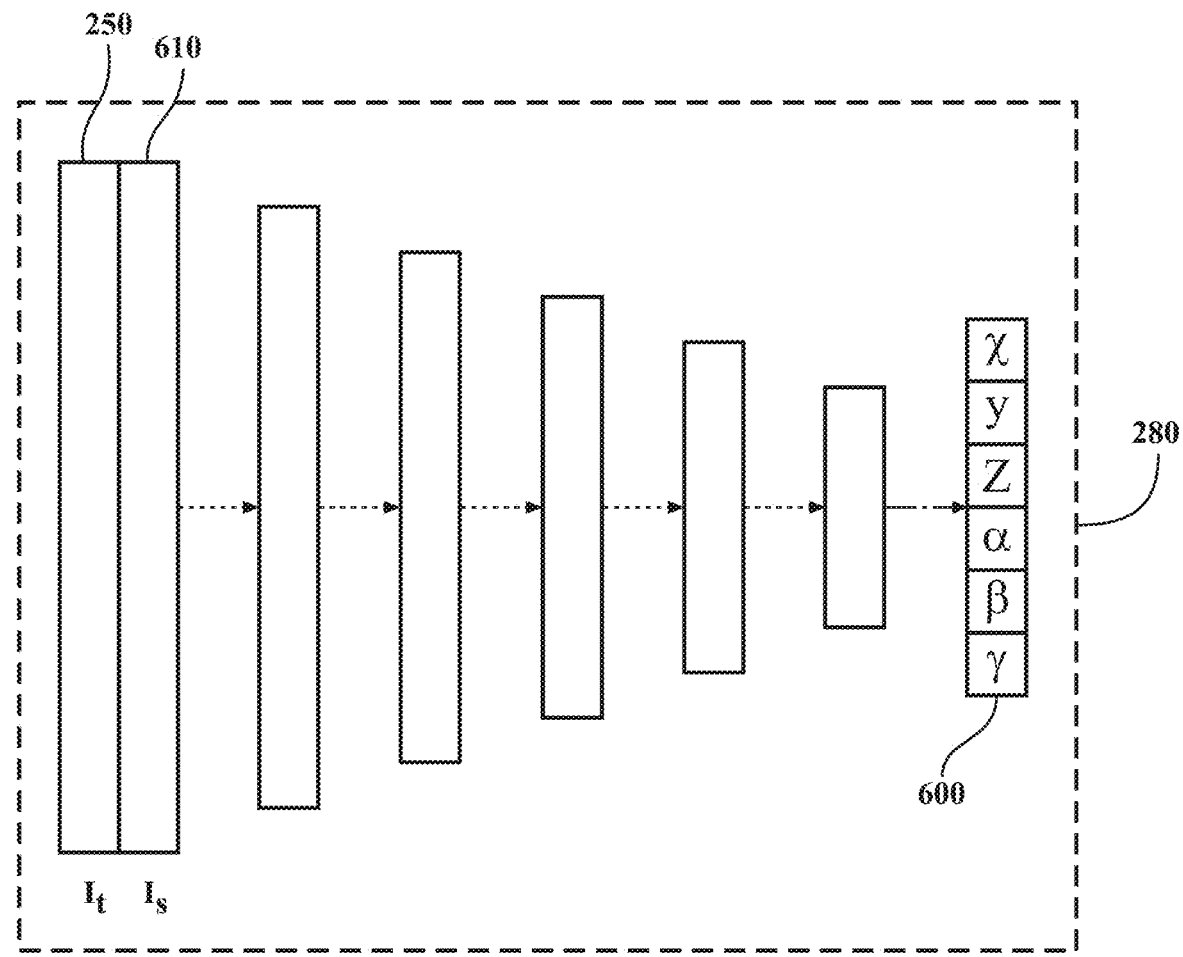
FIG. 6 illustrates one embodiment of a pose model.

With reference to FIG. 5, one configuration 500 of the semantic model 290 in combination with the depth model 260 is illustrated. The configuration 500 shows the guiding connections 340 that convey the semantic features from the semantic model 290 to the depth model 260. The guiding connections 340 further include the guiding convolutions that are not explicitly illustrated in FIG. 5. The semantic model 290 is, in one embodiment, a machine learning algorithm such as a convolutional neural network (CNN) or CNN-based deep neural network that accepts the monocular image 250 as an electronic input and generates the semantic features therefrom. In one or more aspects, the semantic model 290 is a Feature Pyramid Network (FPN) with a ResNet backbone. Accordingly, the semantic model 290 generally performs the process of semantic segmentation on the monocular image 250 to identify the components and boundaries of the components represented therein.

The semantic model 290 is generally pre-trained for identifying features in images, and may further be integrated with another system of the vehicle 100 for supporting another task such as object detection in support of a collision avoidance system, mapping system, etc. Accordingly, the semantic model 290 may provide the semantic features to the depth model 260 as a secondary task for which the semantic features are already available and the guiding connections 340 redirect a copy of the semantic features from the intermediate locations within the semantic model 290. As such, the semantic model 290 may process the monocular image 250 in parallel with the depth model 260 as the monocular image 250 is made available by the camera 126.

The semantic features themselves, as previously noted, identify separate components that the image 250 depicts. In one embodiment, the depth module 220 includes instructions that function to control the semantic model 290 to process the image 250 and define semantic features to distinguish between the components on a per-pixel basis. While the depth module 220 is noted as controlling the semantic model 290, it should be appreciated that, in one or more approaches, the semantic model 290 is integrated with the depth module 220. Thus, the depth module 220 may implement various routines/functions of the model 290 while storing data values (e.g., weights) of the model 290 in the data store 240. Alternatively, another separate system of the vehicle 100 (e.g., advanced driving assistance system (ADAS)) may implement the semantic model 290, and the depth module 220 may communicate with the separate system to acquire information from the semantic model 290.

In any case, the semantic model 290 generates the semantic features according to the components (e.g., objects, surfaces, etc.) within the image 250, which intrinsically define boundaries between different aspects of the image 250 by, for example, associating individual pixels with respective components in the image 250. This distinction between boundaries of the different components provides knowledge about the locations of discontinuities (i.e., regions of changing depth) within the image 250, which the depth model 260 may otherwise experience difficulties in identifying. Consequently, injecting the semantic features into the depth model 260 provides for guiding determinations of the depth features with additional knowledge about the discontinuities, thereby avoiding the difficulties and improving prediction of depths from the monocular image 250.

Figure 3:
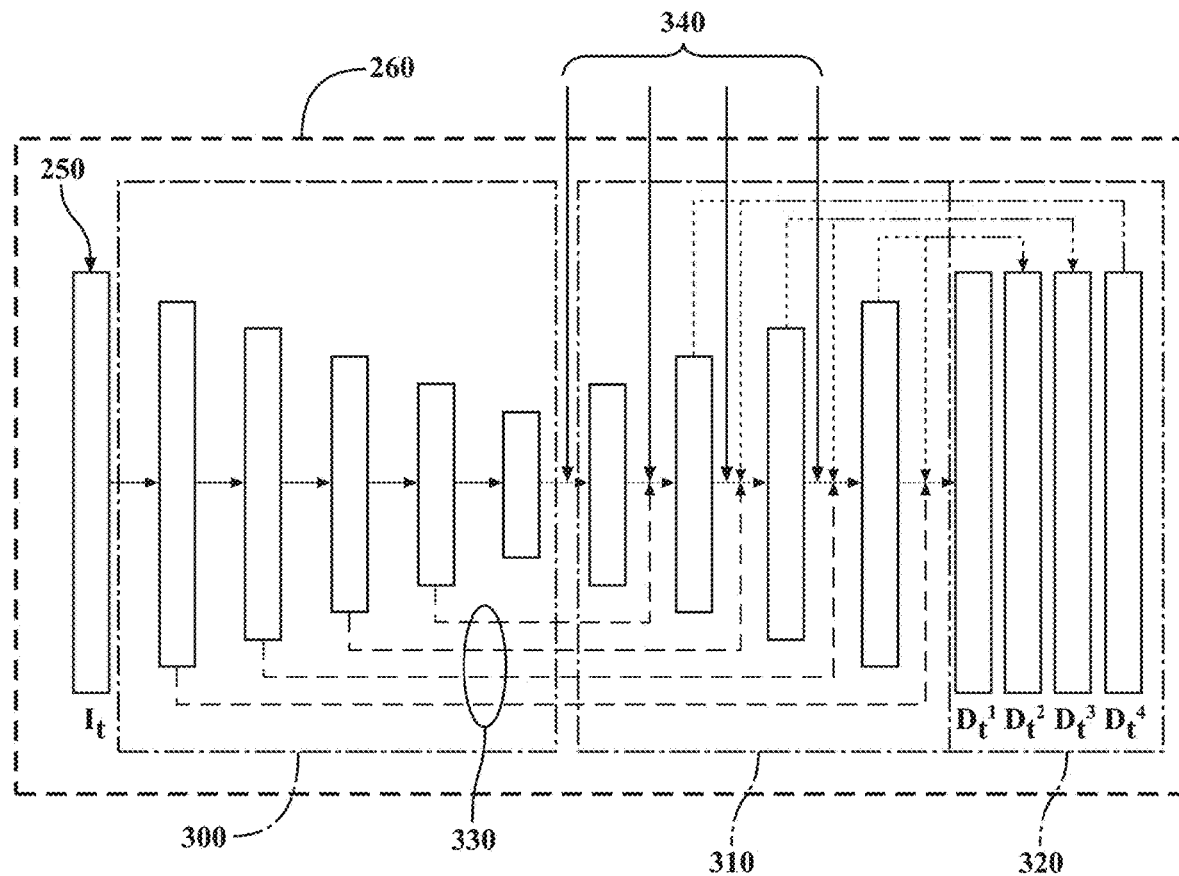
FIG. 3 illustrates one embodiment of a depth model as may be employed by the depth system of FIG. 2.

With reference again to the depth model 260 of FIGS. 3 and 5, the depth module 220, in one embodiment, employs the depth model 260 to produce the depth map 270 as an inverse mapping having inverse values for the depth estimates. That is, instead of providing plain depth data, the depth module 220 implements the depth model 260 to provide the depth estimates, in one approach, in an inverse form. Thus, the depth module 220 may subsequently invert the values of the depth map 270 to provide the depth values or the image module 230 may separately invert the depth map 270 to generate depth estimates. Moreover, the depth module 220 may also selectively output the depth map 270 from the depth model 260 at different points in processing in order to provide the depth map 270 at different scales. Four separate examples of the different scales ($D_t$) are shown in FIG. 3. However, it should be appreciated that the depth module 220, in alternative arrangements, can provide the depth map 270 from the depth model 260 at different scales than those that are noted.

Additionally, the depth module 220, in one or more embodiments, provides, for example, the depth map 270 at the different scales separately to different systems in the vehicle 100 via the image module 230. That is, separate systems may function on finer or coarser resolutions of depth information depending on a particular task that is undertaken. Accordingly, the depth module 220 can separately provide the different scales to the various systems and/or omit subsequent processing where a fuller resolution of the depth map 270 is not required. As such, the depth module 220 generally provides a robust implementation for resolving depth estimates that can be adapted to different systems.

Moreover, referring back to FIG. 2, in one embodiment, the image module 230 generally includes instructions that function to control the processor 110 to execute various actions in support of the depth module 220. For example, in one embodiment, the image module 230 receives the monocular image 250 from the camera 126 and provides the image 250 to the depth module 220. The image module 230, in one or more approaches, acquires the image 250 by controlling the camera 126 to capture the image 250 via passively receiving the image 250 from a data bus, or electronic memory, or another available communication pathway. The image module 230 may also perform pre-processing on the image 250 to provide the image 250 in a format that is accepted by the depth model 260.

In further approaches, the image module 230 handles outputs from the depth module 220/model 260. That is, the image module 230 includes instructions to, for example, perform one or more post-processing routines, provide the depth map 270 to additional systems/modules in the vehicle 100 in order to control the operation of the modules and/or the vehicle 100 overall, and so on. In still further aspects, the image module 230 communicates the depth map 270 to a remote system (e.g., cloud-based system) as, for example, a mechanism for mapping the surrounding environment or for other purposes (e.g., traffic reporting, etc.). As one example, the image module 230 uses the depth map 270 to map locations of obstacles in the surrounding environment and plan a trajectory that safely navigates the obstacles. Thus, the image module 230, in one embodiment, uses the depth map 270 to control the vehicle 100 to navigate through the surrounding environment.

In further aspects, the image module 230 conveys the depth map 270 to further internal systems/components of the vehicle 100, such as the autonomous driving module 160. By way of example, in one arrangement, the image module 230 acquires the depth map 270 and conveys the depth map 270 to the autonomous driving module 160 in a particular scale that the module 160 accepts as an electronic input. In this way, the depth system 170 informs the autonomous driving module 160 of the depth estimates to improve situational awareness and planning of the module 160. As such, the module 160 may acquire the depth map 270 as a primary source of depth information for the surrounding environment or, in one approach, as a secondary source that verifies other means (e.g., LiDAR data). It should be appreciated that the autonomous driving module 160 is indicated as one example, and, in further arrangements, the image module 230 may provide the depth map 270 to the module 160 and other components in parallel.

Furthermore, in one embodiment, the image module 230 includes instructions to train the depth model 260. The image module 230, in one embodiment, trains the depth model 260 using a self-supervised scale-aware structure from motion (SfM) process. Thus, to initiate the depth model 260, the image module 230 uses images from video of a scene and formulates the generation of the depth map 270 as a photometric error minimization across the images. In general, the image module 230 trains the depth model 260 by causing the depth module 220 to execute the depth model 260 as though the typical operation is underway, however, the image module 230 provides one of the images from the video as the monocular image 250 for processing.

Accordingly, in relation to the novel architecture 500 described in FIG. 5, the image module 230 trains the depth model 260 while the depth model 260 receives the semantic features from the semantic model 290. The semantic model 290 is generally a pre-trained network that the image module 230 may initialize from pre-trained weights acquired via a separate training process for the semantic model 290. As such, for the training of the depth model 260, the image module 230 retains the weights of the semantic model 290 while adapting the weights of the depth model 260.

As such, the image module 230 uses the resulting map 270 to synthesize the matching image of the pair from the video in combination with a rigid-body transformation (e.g., 6-DoF SE(3)). Thus, with reference to FIG. 6, in addition to the depth model 260, the depth system 170, in one approach, implements a further machine learning algorithm in the form of a pose network 280 that generates the rigid-body transformation 600 according to the noted images (i.e., two images of a same scene from the video, such as image 250 and a successive image 610). The pose network 280 is, for example, a convolutional neural network that is comprised of a series of convolutional and average pooling layers. In one embodiment, the pose network 280 is comprised of seven convolutional layers followed by a final one-by-one convolutional layer and a six-channel average pooling operation. The input to the pose network 280 includes the image 250 (target image), and a context image 610 that may be concatenated together as a single input.

The image module 230, in at least one approach, uses the transformation to produce the synthesized image, which can then be compared with the original image 250 to determine an error. The error is, for example, the photometric loss, a reprojection loss, and/or another loss value that assesses the accuracy of the depth model 260. Thus, the image module 230 uses the calculated loss to adjust the depth model 260, thereby training the model 260 to produce depth estimates using video as opposed to, for example, image pairs from a stereo camera.

In general, the image module 230 trains the depth model 260 over a training data set of monocular video images. Through the process of training the model 260, the image module 230 adjusts various hyper-parameters in the model 260 to fine-tune the functional blocks included therein. Accordingly, the image module 230 trains the encoder 300 and the decoder 310, including the various functional blocks included therein. Moreover, the image module 230, in one approach, further implements a generative neural network or other algorithm to synthesize the matching image from the depth map 270 and the rigid-body transform. In various approaches, the generative network can be integrated as part of the depth model 260 or implemented in a standalone configuration. In either case, the image module 230 trains the model 260 in a self-supervised approach through the use of pairs of monocular images from the video, and, in a further arrangement, also trains the pose network 280 in combination using the loss as at least part of a loss function to adapt the pose network 280.

Through this training process, the model 260 develops a learned prior of the monocular images as embodied by the internal parameters of the model 260 from the training on the images, which is guided for separate images by the semantic features, which the guiding connections 340 injects from the semantic model 290. In general, the depth model 260 develops the learned understanding about how depth relates to various aspects of an image according to, for example, size, perspective, and other features that may be guided by the discontinuities identified in the semantic features. Consequently, the resulting trained depth model 260 is leveraged by the depth system 170 to estimate depths from monocular images that do not include an explicit modality identifying the depths.

Figure 7:
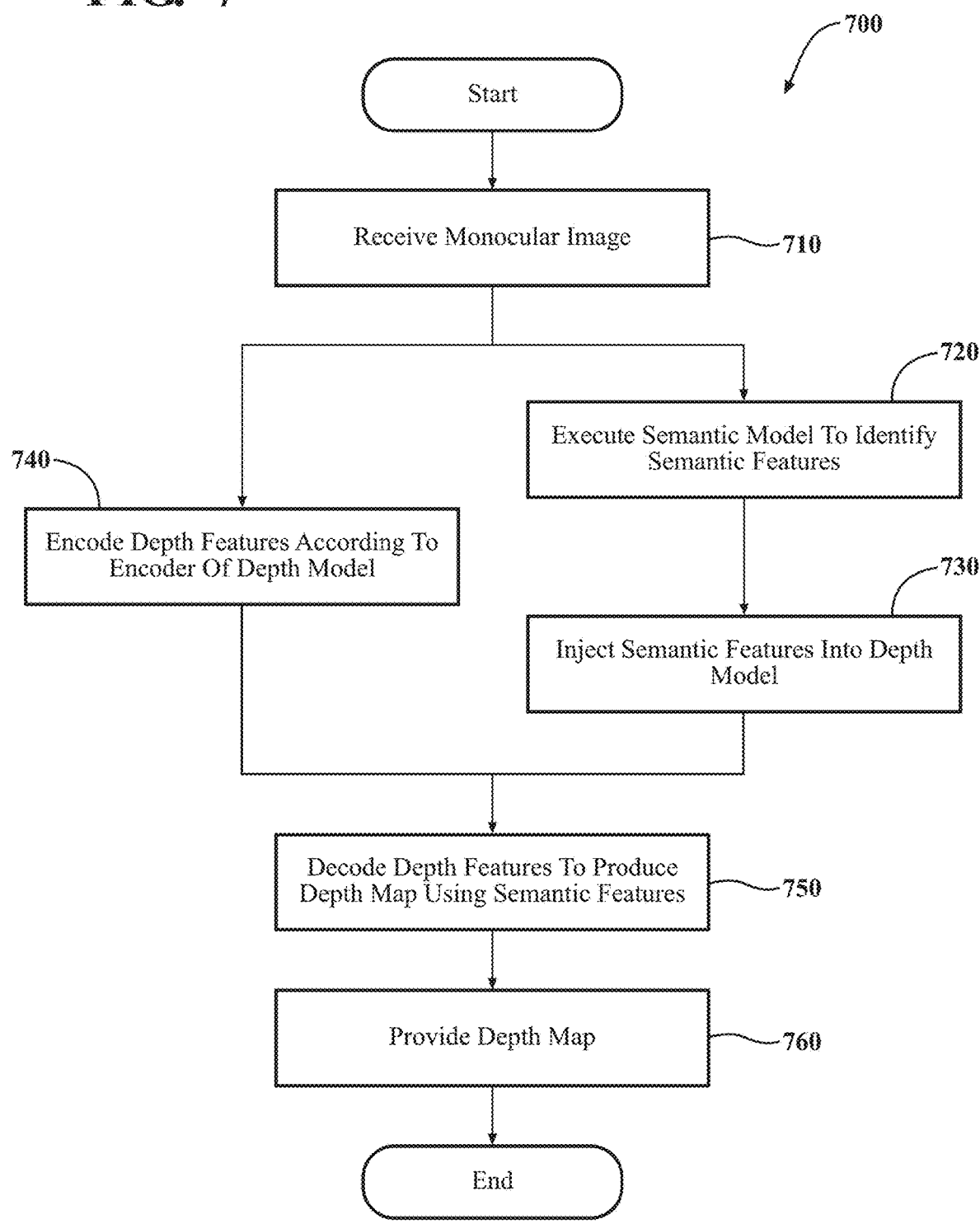
FIG. 7 illustrates a flowchart of one embodiment of a method associated with estimating depths within a surrounding environment from a monocular image using semantic features.

Additional aspects of generating depth estimates from monocular images will be discussed in relation to FIG. 7. FIG. 7 illustrates a flowchart of a method 700 that is associated with using semantic features to guide a depth model in generating depth estimates. Method 700 will be discussed from the perspective of the depth system 170 of FIGS. 1-2. While method 700 is discussed in combination with the depth system 170, it should be appreciated that the method 700 is not limited to being implemented within the depth system 170 but is instead one example of a system that may implement the method 700.

At 710, the image module 230 acquires the monocular image 250. In one embodiment, the image module 230 acquires the monocular image 250 locally from co-located systems with the depth system 170 (e.g., the camera 126), while in further embodiments, the image module 230 may acquire the image 250 through a communication link with a remote system. Thus, while the depth system 170 can be implemented within a particular device that is, for example, actively navigating an environment, the depth system 170 may also function as a cloud-based computing service to analyze monocular images for depth information or as a statically mounted device in an environment (e.g., mounted to a traffic signal). As previously described, the monocular image 250 itself may have different characteristics according to different implementations but generally is a single image that does not include explicit depth information.

At 720, the depth module 220 identifies the semantic features in the monocular image 250 according to the semantic model 290. As previously described, the depth module 220 may directly implement the semantic model 290, and, thus, control the semantic model 290 to generate the semantic features from the image 250 or, in further embodiments, may acquire the semantic features from the semantic model 290 that is executing as part of another system. In either case, the semantic model 290 executes over the image 250 to perform semantic segmentation and generate the semantic features. As previously described, the semantic features distinguish between objects and other aspects represented in the image 250 thereby delineating depth discontinuities in the monocular image.

At 730, the depth module 220 injects the semantic features into the depth model 260. In one embodiment, the depth module 220 provides a pathway from the semantic model 290 to the depth model 260. The pathway may include guiding connections between particular layers of the semantic model 290 and the depth model 260 that correspond with a resolution of the features between the models. That is, the semantic features are provided at separate instances in the processing of the image 250 by the guiding connections in order to convey semantic features that correspond in detail/resolution with layers of the depth model 260 to which the semantic features are injected.

In various approaches, the guiding connections 340 may further integrate additional intermediate processing to adapt the semantic features prior to injection into the depth model 260. That is, as previously detailed, the guiding connections 340 may include a series (e.g., two successive layers) of guiding convolutional layers that process the semantic features to ensure the semantic features precisely conform with a form (i.e., dimensions) of depth features being processed at a particular decoding layer in the depth model 260. In this way, the depth module 220 provides semantic features into the depth model 260 to supervise the inference of the depth estimates.

At 740, the depth module 220 encodes the monocular image 250 according to encoding layers of the depth model 260. As previously described, the encoder 300 of the depth model 260 includes multiple separate layers arranged in succession that function, when executed by the depth module 220, to iteratively encode the monocular image 250 to generate feature maps at successively refined representations. In other words, the encoder 300 initially accepts the monocular image 250 as an electronic input and then proceeds to iteratively encode features represented therein across the separate encoding layers. Thus, the encoding layers generate successively refined intermediate feature maps across the layers that are generally characterized by different dimensions.

As noted, the encoding process may involve packing blocks or other functional blocks distributed among the encoding layers that function to fold spatial dimensions of the feature maps into additional channels to capture sub-pixel information across the successive layers. Thus, the encoding process may involve capturing the depth features by adding channels to an intermediate feature map and also by providing the intermediate feature maps via skip connections to corresponding layers of the decoder 310. In this way, the encoder 300 functions to preserve information throughout the encoding process.

At 750, the depth module 220 decodes the depth features from the encoder 300 according to decoding layers of the depth model 260 that include pixel-adaptive convolutions. As outlined along with FIG. 4, the pixel-adaptive convolutions adapt weights to facilitate identifying boundaries of the components (i.e., discontinuities), thereby improving depth estimates in relation to the boundaries between the components. Otherwise, the depth module 220 decodes the depth feature maps according to decoding layers of the depth model 260 to produce the depth estimates. Thus, the pixel-adaptive convolutions may be drop-in components that can adapt a structure of an existing depth model in order to improve depth inferences in relation to discontinuities and in relation to smaller objects that are broadly characterized by discontinuities.

In one embodiment, the decoder 310, as executed by the depth module 220, iteratively decodes the depth features maps associated with separate ones of the encoding layers while accepting the semantic features as additional guiding inputs from the semantic model 290. Thus, in combination with retained information conveyed via the skip connections between the encoding and decoding layers, the depth model 260 is able to better resolve the depth estimates. In other words, the decoding layers (e.g., unpacking blocks and pixel-adaptive convolutions) apply sub-pixel convolutional transformations that super-resolve high-resolution data from multi-scale low-resolution convolutional features learned by the depth model 260 and guided by the semantic features.

Accordingly, the depth model 260 uses the detailed information encoded in the extra channels by the encoder 300, high-resolution feature maps relayed by the skip connections, and information about boundaries of the components from the guiding connections 340 to generate improved depth maps at various scales.

In one embodiment, the depth module 220 generates the depth map 270 by producing a set of maps at multiple different scales. In one approach, the depth module 220 extracts the different scales of the depth map 270 at different layers of the depth model 260 (e.g., layers 16, 19, 22, 25). That is, during the process of generating a final version of the depth map 270, the depth model 260, in one approach, derives the separate scales by extracting intermediate outputs of the decoding layers. The intermediate outputs are configured in the separate scales. Additionally, the separate depth maps 270 are provided in an inverse form. That is, instead of providing the maps 270 as explicit estimates, the maps 270 include inverse values as a byproduct of the way in which the depth model 260 generates the maps 270.

At 760, the image module 230 provides the depth map 270 as the depth estimates of components (e.g., objects, surfaces, etc.) represented in the monocular image 250. As should be appreciated, in one embodiment, the image module 230 electronically provides the map 270 to other systems of the vehicle 100 in support of, for example, autonomous planning and navigation of the vehicle 100. Of course, in further implementations, the image module 230 communicates the map 270 to a remote device that originally provides the image 250 as a response to an original request for depth information. Moreover, as an additional aspect of providing the depth map 270, the image module 230, in one or more embodiments, converts the inverse values into explicit depth estimates prior to communicating the map 270.

In general, the depth system 170 and the depth model 260 can be employed in various contexts in support of active autonomous navigation, scene analysis, metadata analysis (e.g., traffic analysis), and so on. In either case, the approach embodied within the depth system 170 provides a unique and improved approach to leveraging monocular images in order to resolve high-resolution depth data without difficulties associated with bleeding and unresolved small objects.

One example of how the depth system 170 may train the depth model 260 is illustrated in relation to FIG. 8. FIG. 8 illustrates a flowchart of a method 800 that is associated with training a depth model that uses semantic features to guide generating depth estimates. Method 800 will be discussed from the perspective of the depth system 170 of FIGS. 1-2. While method 800 is discussed in combination with the depth system 170, it should be appreciated that the method 800 is not limited to being implemented within the depth system 170 but is instead one example of a system that may implement the method 800. Moreover, the method 800 is illustrated as including several functional blocks from the method 700. It should be appreciated that many of the functions discussed in relation to FIG. 7 are repeated as part of training the depth model 260, and, thus, will not be repeated for purposes of the brevity of this disclosure.

At 810, the image module 230 receives the training data. In general, the training data includes separate images from a monocular camera (e.g., camera 126) that form a video. Thus, an individual round of training for the depth model 260 includes two monocular images of a same scene from the video. The images may be consecutive but are generally separated by multiple intervening images in the video. This form of training is generally characterized as a self-supervised process that leverages a structure from motion (SfM) approach. Thus, the depth model 260 is executed over one of the images of the pair in the same fashion as previously described at blocks 720-750. Similarly, the semantic model 290 is executed over the same image from the pair in order to replicate a standard process for the models 260 and 290.

Thus, after the models 260 and 290 execute to generate the depth map, the image module 230 may execute further training routines. For example, at 820, the image module 230 computes a loss. The loss characterizes an accuracy of the depth model 260 in producing the depth map. The loss may take different forms such as a photometric loss, a reprojection loss, a combination of different losses, and so on. In any case, the image module 230 synthesizes an image from the depth map and a transformation generated by the pose model 280 according to the original pair of inputs images.

At 830, the image module 230 uses the loss to adapt the depth model 260. In one embodiment, adapting the depth model 260 generally involves changing weights within separate layers of the model 260. Thus, in at least one approach, the image module 230 changes weights within the pixel-adaptive convolutions of the decoder 310 when training the model 260. In this way, the depth system 170 improves the generation of depth estimates by the depth model 260.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof.

The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element, or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The processor(s) 110, the depth system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the depth system 170, and/or the autonomous driving module(s) 160 may control some or all of these vehicle systems 140 and, thus, may be partially or fully autonomous.

The processor(s) 110, the depth system 170, and/or the autonomous driving module(s) 160 can be operatively connected to communicate with the various vehicle systems 140 and/or individual components thereof. For example, returning to FIG. 1, the processor(s) 110, the depth system 170, and/or the autonomous driving module(s) 160 can be in communication to send and/or receive information from the various vehicle systems 140 to control the movement, speed, maneuvering, heading, direction, etc. of the vehicle 100. The processor(s) 110, the depth system 170, and/or the autonomous driving module(s) 160 may control some or all of these vehicle systems 140.

The processor(s) 110, the depth system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the depth system 170, and/or the autonomous driving module(s) 160 can control the direction and/or speed of the vehicle 100. The processor(s) 110, the depth system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the depth system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-8, but the embodiments are not limited to the illustrated structure or application.

The flowcharts and block diagrams in the Figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A depth system for generating depth estimates of an environment depicted in a monocular image, comprising:
one or more processors;
a memory communicably coupled to the one or more processors and storing:
a depth module including instructions that, when executed by the one or more processors, cause the one or more processors to:
identify semantic features in the monocular image according to a semantic model,
inject the semantic features into a depth model using pixel-adaptive convolutions, and
generate a depth map from the monocular image using the depth model that is guided by the semantic features, wherein the pixel-adaptive convolutions are integrated into a decoder of the depth model to provide the semantic features to the depth model; and
an image module including instructions that, when executed by the one or more processors, cause the one or more processors to provide the depth map as the depth estimates for the monocular image.

2. The depth system of claim 1, wherein the depth module includes instructions to generate the depth map using the depth model including instructions to i) encode the monocular image according to encoding layers of the depth model to generate depth features at successively refined representations, and ii) decode the depth features according to decoding layers of the depth model that include the pixel-adaptive convolutions, and
wherein the depth module includes instructions to generate the depth map without using prior depth information.

3. The depth system of claim 1, wherein the depth module includes instructions to inject the semantic features into the depth model according to guiding convolutions that accept the semantic features from the semantic model and transform the semantic features for use by the depth model to guide decoding layers of the depth model using the semantic features, wherein the guiding convolutions are intermediate convolutional layers that process the semantic features between the semantic model and the depth model, and
wherein the semantic features correspond to components depicted in the monocular image and define boundaries of components in the monocular image.

4. The depth system of claim 1, wherein the pixel-adaptive convolutions include kernels that adapt generation of the depth estimates for objects according to the semantic features by weighting kernels within a feature space associated with the image according to a correspondence with the semantic features to refine depth features.

5. The depth system of claim 1, wherein the semantic model is a machine learning model that performs semantic segmentation of the monocular image to identify objects, and
wherein the depth model is a machine learning model that performs depth estimation over images from a monocular camera.

6. The depth system of claim 1, wherein the depth module includes instructions to inject the semantic features into the depth model in order to guide generation of the depth map by delineating depth discontinuities in the monocular image according to the semantic features.

7. The depth system of claim 1, wherein the depth model is comprised of encoder layers and decoder layers with skip connections between encoder layers and decoder layers, wherein the semantic model provides the semantic features to separate ones of the decoder layers via guiding convolutions at successive resolutions,
wherein the depth model and the semantic model execute in parallel, and wherein the semantic model produces the semantic features for the depth model as a secondary task.

8. The depth system of claim 1, wherein the depth module includes instructions to train the depth model using a training algorithm that is self-supervised and accounts for motion of a camera between successive monocular training images using a loss function that accounts for structure from motion (SfM), and
wherein the depth module includes instructions to train the depth model by using a pose model to account for the motion, and adjusting the depth model including at least hyperparameters in the pixel-adaptive convolutions.

9. A non-transitory computer-readable medium for generating depth estimates of an environment depicted in a monocular image and including instructions that when executed by one or more processors cause the one or more processors to:
identify semantic features in the monocular image according to a semantic model;
inject the semantic features into a depth model using pixel-adaptive convolutions;
generate a depth map from the monocular image using the depth model that is guided by the semantic features, wherein the pixel-adaptive convolutions are integrated into a decoder of the depth model to provide the semantic features to the depth model; and
provide the depth map as the depth estimates for the monocular image.

10. The non-transitory computer-readable medium of claim 9, wherein the instructions to generate the depth map using the depth model include instructions to i) encode the monocular image according to encoding layers of the depth model to generate depth features at successively refined representations, and ii) decode the depth features according to decoding layers of the depth model that include the pixel-adaptive convolutions, and
wherein the instructions to generate the depth map include instructions to generate the depth map without using prior depth information.

11. The non-transitory computer-readable medium of claim 9, wherein the instructions to inject the semantic features into the depth model include instructions to inject the semantic features according to guiding convolutions that accept the semantic features from the semantic model and transform the semantic features for use by the depth model to guide decoding layers of the depth model using the semantic features, wherein the guiding convolutions are intermediate convolutional layers that process the semantic features between the semantic model and the depth model, and wherein the semantic features correspond to components depicted in the moncoular image and define boundaries of the components in the monocular image.

12. The non-transitory computer-readable medium of claim 9, wherein the pixel-adaptive convolutions include kernels that adapt generation of the depth estimates for objects according to the semantic features by weighting kernels within a feature space associated with the image according to a correspondence with the semantic features to refine depth features.

13. The non-transitory computer-readable medium of claim 9, wherein the semantic model is a machine learning model that performs semantic segmentation of the monocular image to identify objects, and wherein the depth model is a machine learning model that performs depth estimation over images from a monocular camera.

14. A method of generating depth estimates of an environment depicted in a monocular image, comprising:

identifying semantic features in the monocular image according to a semantic model;

injecting the semantic features into a depth model using pixel-adaptive convolutions;

generating a depth map from the monocular image using the depth model that is guided by the semantic features, wherein the pixel-adaptive convolutions are integrated into a decoder of the depth model; and providing the depth map as the depth estimates for the monocular image.

15. The method of claim 14, wherein generating the depth map using the depth model includes i) encoding depth features from the monocular image according to encoding layers of the depth model, and ii) decoding the depth features according to decoding layers of the depth model that include the pixel-adaptive convolutions, and wherein generating the depth map includes generating the depth map without using prior depth information.

16. The method of claim 14, wherein injecting the semantic features into the depth model includes applying guiding convolutions that accept the semantic features from the semantic model and transform the semantic features for use by the depth model to guide decoding layers of the depth model using the semantic features, wherein the guiding convolutions are intermediate convolutional layers that process the semantic features between the semantic model and the depth model, and wherein the semantic features correspond to components depicted in the monocular image and define boundaries of the components in the monocular image.

17. The method of claim 14, wherein the pixel-adaptive convolutions include adaptive kernels that adapt generation of the depth estimates for objects according to the semantic features by weighting kernels within a feature space associated with the image according to a correspondence with the semantic features to refine depth features.

18. The method of claim 14, wherein the semantic model is a machine learning model that performs semantic segmentation of the monocular image to identify objects, and wherein the depth model is a machine learning model that performs depth estimation over images from a monocular camera.

19. The method of claim 14, wherein the depth model and the semantic model execute in parallel, wherein the semantic model produces the semantic features for the depth model as a secondary task, wherein injecting the semantic features into the depth model guides generation of the depth map by the depth model by delineating depth discontinuities in the monocular image according to the semantic features.

20. The method of claim 14, further comprising:

training the depth model using a training algorithm that is self-supervised and accounts for motion of a camera between successive monocular training images in training data using a loss function that accounts for structure from motion (SfM), wherein training the depth model includes executing a pose model to account for the motion, and adjusting the depth model including at least hyperparameters in the pixel-adaptive convolutions.

* * * * *